Jan. 31, 1967 W. L. HORSTMAN 3,300,942
METHOD OF CONSTRUCTING NATURAL DRAFT COOLING TOWER
Filed Feb. 10, 1964 2 Sheets-Sheet 1
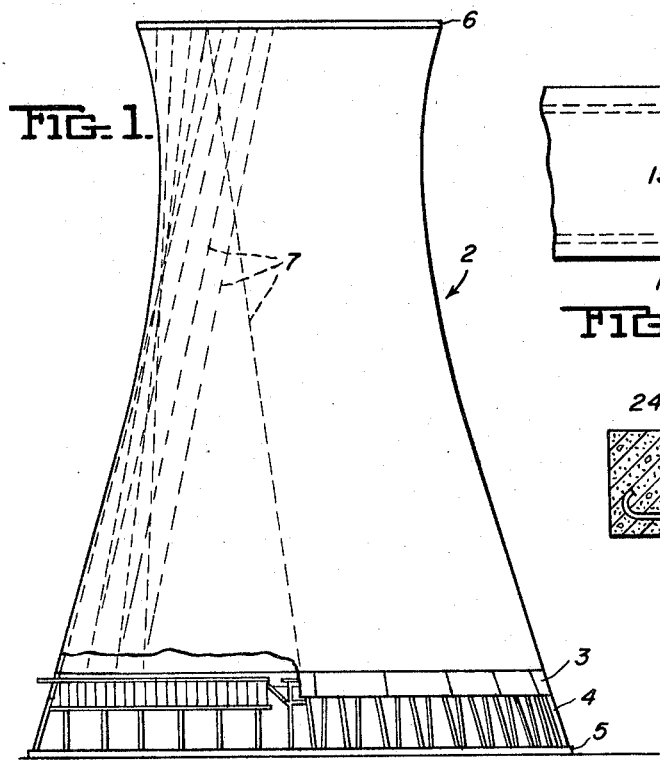
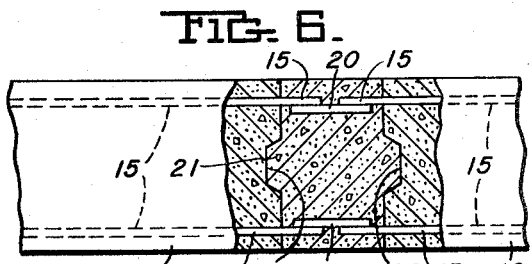
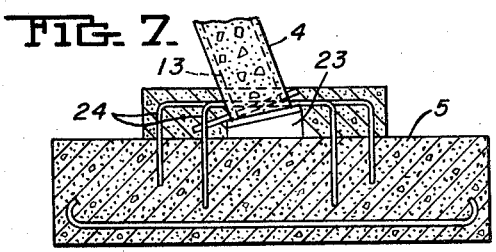
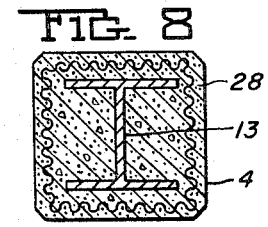
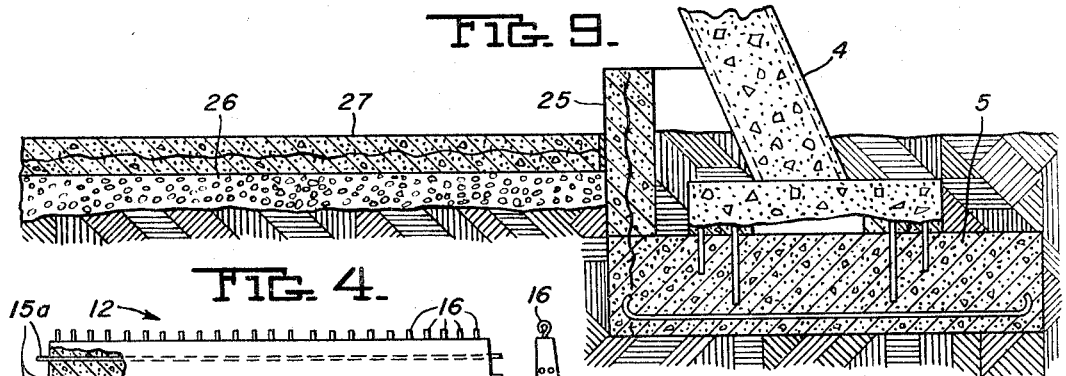
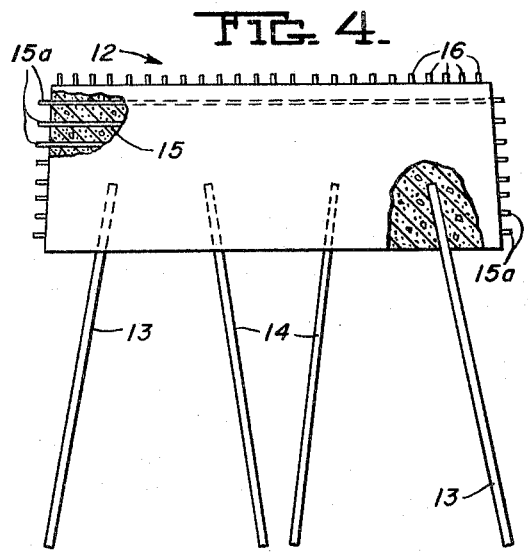
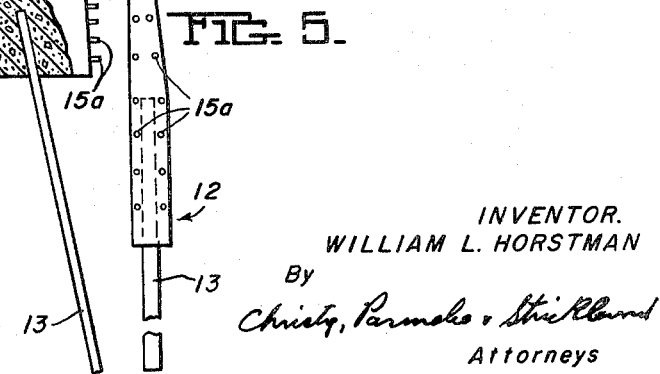
INVENTOR.
WILLIAM L. HORSTMAN
By
Christy, Parmelee & Strickland
Attorneys

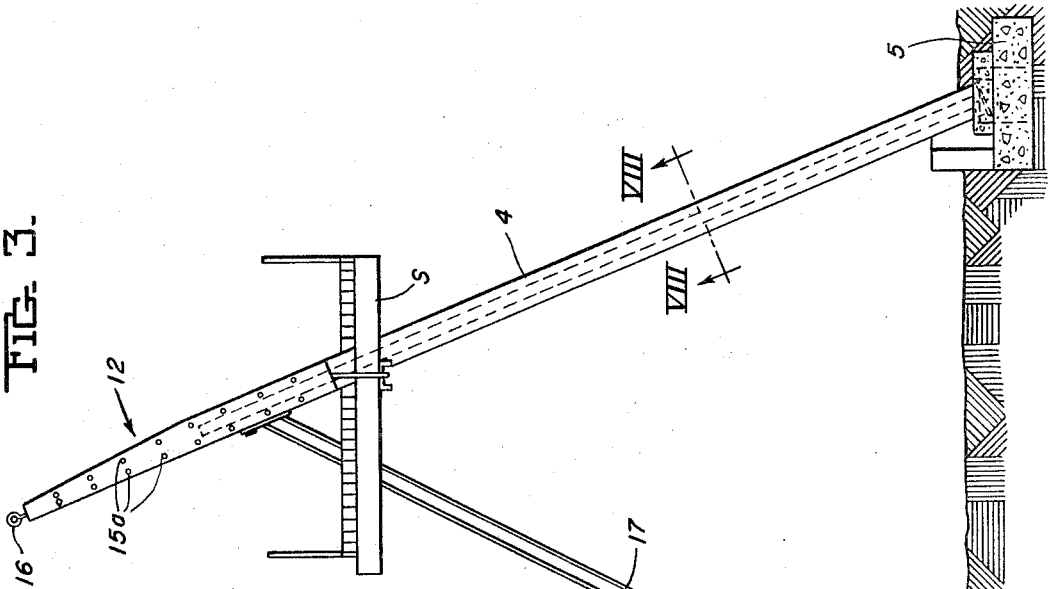
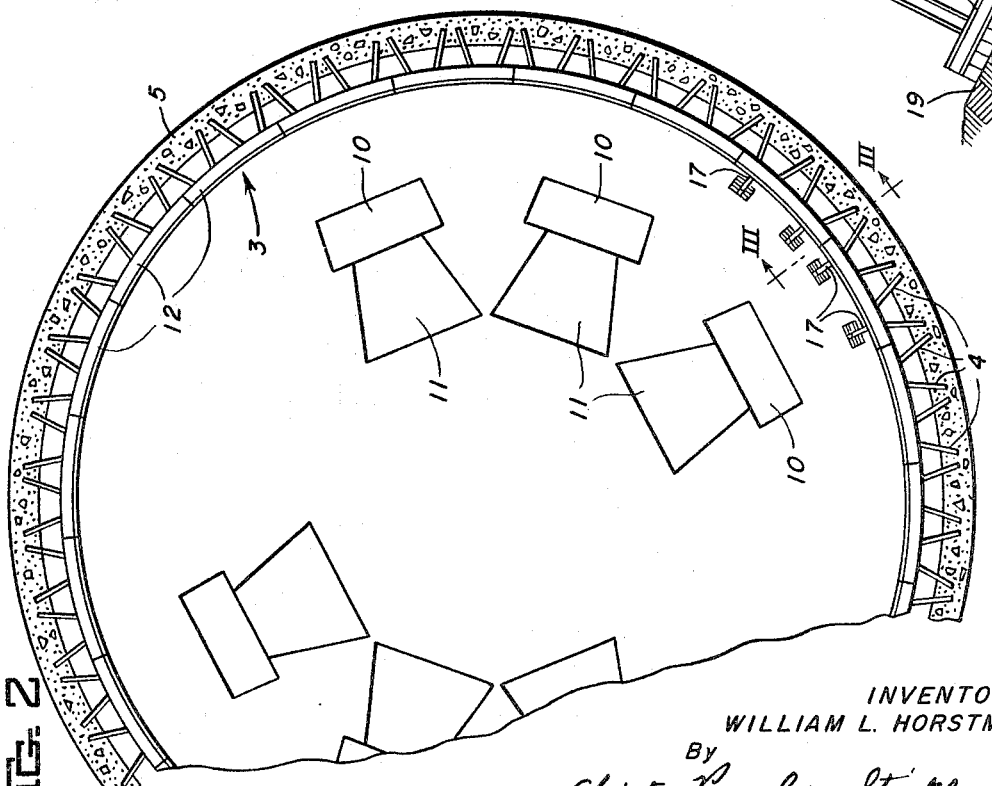

United States Patent Office 3,300,942
Patented Jan. 31, 1967

3,300,942
METHOD OF CONSTRUCTING NATURAL DRAFT COOLING TOWER
William L. Horstman, Thornburg, Pa., assignor to Dravco Corporation, Pittsburgh, Pa., a corporation of Pennsylvania
Filed Feb. 10, 1964, Ser. No. 343,867
6 Claims. (Cl. 52—742)

This invention relates to towers for cooling water and a method for constructing the same. The exterior contour of the walls of these towers usually defines a generally hyperbolic curve to that they are known also as hyperbolic cooling towers.

Towers of this type are generally provided for use with steam power generating plants where a large volume of cooling water is required for circulation through condensers, and where there is no adequate natural water supply, such as a river or lake, so that the same water must be continuously recirculated. The purpose of the cooling tower is to cool the water after it has passed through a steam condenser or other heat exchanger so that it may be effectively reused.

These towers comprise a hollow shell, the bottom of which is elevated above the ground level, whereby air may enter at the bottom while the hot water to be cooled is discharged though spray pipes with upwardly-directed nozzles in the lower portion of the tower in fountain-like fashion falling onto a filler, usually comprised of heavy timber over which the water flows in numerous small streams into a collecting basin. From the collecting basin the water is removed for reuse. The air becoming heated from contact with the water, rises, producing a chimney effect or draft, continuously drawing in new air at the bottom and discharging warm air at the top. There is of course not only cooling by direct heat exchange from the warmer water to the cooler air, but some evaporative cooling inevitably occurs.

Large volumes of water are involved and large quantities of heat must be dissipated so that these cooling towers are very large structures, being of the order of 250 feet to more than 300 feet in height, with a base diameter between 200 and 300 feet and a top diameter well in excess of 100 feet, these dimensions varying in different towers, but they indicate the general magnitude of these structures and give some concept of the problems involved in their construction.

In building such a tower, a base ring is first constructed at the required height above ground level. This has heretofore been done by erecting a circular scaffolding at the required level and building on it a form in which a circular concrete wall is cast. With the base ring finished and supported on the scaffold, a top ring of smaller diameter is suspended from the top of a central mast. Wires are then stretched diagonally from closely spaced eyes on the base ring in opposite angles to eyes on the top ring. This network of wires extending in opposite diagonals from the base to the top around the entire circumference of the top and bottom rings defines a structure which is of maximum diameter at the base, of minimum diameter at a level below the top ring, and which enlarges from the level of minimum diameter to the top ring; that is, the sides of the structure define a hyperbolic curve. With a pressure gun an air-hardening cementitious composition is sprayed over the network to form the shell of the structure, and when the cement composition has set, the central mast is removed and the structure is self-sustaining.

The present invention has to do primarily with the bottom ring construction and the method of constructing the same, whereby the heavy scaffolding and timber supports are not required. It contemplates the formation of the bottom ring in sections which are cast in forms on the ground with structural steel supports embedded therein. These sections are then raised into position and held with temporary props in position. The space between confronting ends of the sections is filled with an air-hardening cementitious material. When a complete ring has been formed, it resembles a ring section of a large diameter cone, supported on structural steels legs or supports, and after the cement between section ends has set, the temporary props are removed and the ring, which will be peripherally in compression, is complete and the tower is then completed in much the usual manner. The invention will substantially reduce the cost of building the tower and reduce the labor and material required for the scaffolding.

An object of the invention is to provide an improved self-supporting base ring for structures of this kind, and an improved, simplified and more economical way of constructing the same.

The invention may be more fully understood by reference to the accompanying drawings, wherein:

FIG. 1 is an elevation of a cooling tower constructed in accordance with this invention with a portion broken out to schematically show the location of the fill and with all of the water supply pipes except one omitted;

FIG. 2 is a plan view of the completed ring with some of the temporary props still in place;

FIG. 3 is a transverse vertical section in the plane of line III—III of FIG. 2, but on a larger scale, showing also a temporary working scaffold in place for use in erecting the structure;

FIG. 4 is an elevation of a single section of the base ring before it is integrated into the complete ring;

FIG. 5 is an end view of the section shown in FIG. 4;

FIG. 6 is an enlarged fragmentary view, partly in section and partly in elevation, showing the joint between the ends of two sections;

FIG. 7 is a detail view of a footing for one of the structural legs, the view being a vertical section;

FIG. 8 is a transverse section through one of the legs, showing it encased in concrete, the view being a section in the plane of line VIII—VIII of FIG. 3; and FIG. 9 is a fragmentary vertical section through the base area of the tower below the ring in the finished tower.

Referring first to FIG. 1, 2 designates a typical cooling tower such as contemplated by this invention. The base ring is indicated at 3. The base ring is supported on structural legs 4 which rest on a concrete footer 5. There is a top ring at 6. As explained above, the top ring is initially supported from a central mast, while wires are strung at opposite angles from the base ring to the top ring. A few of such wires have been shown in dotted lines and are indicated at 7. These wires form a mesh network onto which a cementitious air-hardening composition is sprayed to form a continuous lightweight wall from the top of the bottom ring to the top ring 6. In its finished form the tower is generally of monolithic appearance with the wires of course concealed, and the sprayed-on sides merging into the bottom ring.

The tower is open at its top so that air may escape freely, while the bottom ring is elevated above the ground level by the legs 4 so that air may enter freely through the bottom. The filler F, which forms no part of this invention, is schematically indicated in FIG. 1, being formed of a structure through which air may circulate, and over which the water may trickle, and it is supported as indicated on vertical posts above ground level. A single radial water supply pipe, of which there are many, is indicated in the drawing at W. The closed side walls from the bottom ring 3 to the top ring 6 are of course necessary to produce the chimney draft flow of air from the bottom to the top as hereinbefore explained.

According to the present invention, one and preferably several, casting forms are built on the ground at the site where the tower is to be erected. Conveniently these forms may be built inside the area about which the tower is to be erected. Basically they comprise a tray portion 10 of somewhat trapezoidal shape with two parallel sides and two converging sides. Typically these trays would be of the order of 30 feet in length, and perhaps 12 feet in width. Attached to the longer edge of the tray 10 there is an apron 11 providing a support on which the structural legs are rested in the forming of the ring section. As shown in FIG. 4, each ring section designated generally as 12, has four structural steel legs which may be of I-beam sections, two of these at the ends diverging from the ring section 12 downwardly and being designated 13, and the two center ones converging downwardly and being designated 14. These legs are rested on the tray 11 so that the concrete can be poured to embed the top ends of the legs in the concrete. When encased in concrete, these form the finished legs 4 of FIG. 1. Steel reinforcing bars are cast into the panel 12 on each side of the mid plane of the panel and extend horizontally the length of the panel, with the ends of the reinforcing bars projecting beyond the ends of the concrete casting itself. These bars are designated 15 and the projecting ends are marked 15a in FIG. 4. The panel is cast with a number of anchoring eyes 16 embedded in and projecting beyond the top edge of the panel. As shown, the panel may be of diminishing thickness toward the top.

After the panels have been cast from concrete with the legs and reinforcements, the concrete is allowed to set until it is strong and hard. There is also cast a circular concrete footing 5 in the ground where the base of the tower is to be located. Except for the footing and as required for the construction of the forms, the ground inside the footing does not normally need to be disturbed.

When the first ring sections are sufficiently cured, they are lifted to the position shown in FIG. 3 with the legs 13 and 14 resting on the footing 5. Temporary props which may be of structural steel are bolted to the inner face of each panel, these props being designated 17 in FIG. 3. The props are provided with pads 18 at their base, which rest on properly contoured areas of hard ground, as indicated at 19 in FIG. 3. Each ring section or panel when erected inclines upwardly and inwardly toward the vertical axis of the tower and the props 17 support them in this inclined position. The panels are erected in succession around the footing with the ends of adjacent panels in confronting, but slightly spaced, relation. After any two panels have been erected, the projecting ends 15a of the reinforcing bars 15 are welded together by splice bars 20 as shown in FIG. 6 to rigidly connect them.

When two sections have thus been connected, an airhardening cementitious material, such as concrete, cement or grout, is filled into the space between the confronting panel ends, as indicated at 21. The ends of the panels are preferably grooved vertically as indicated at 22 to better key the concrete of material thus filled in to the panels. To enable this joining of the ends of two panels together in this manner, a temporary scaffold S may be clamped to the legs 13 and 14, the particular manner of supporting the scaffold not being material to this invention. In FIGS. 1 and 2 the scale is so small that the joint can appear only as single lines.

The ends of the legs 13 and 14 are attached to metal shims or block 23 setting on and secured to the footer 5 and are anchored by bars 24 embedded in the footer and about which concrete is cast as shown in FIG. 7. When the sections have been placed to form a complete ring with all joints between them filled and the cement filling is hard, the props 17 may be removed, and the base ring, being actually a hollow truncated cone of large diameter and relatively small vertical height, will be self-sustaining since the joints between all panels will be in compression. The footer 5 is in a level plane, so that with all of the legs of equal length, every section can be identical and is of an equal length so calculated that a predetermined number of them will, with substantially uniform spacing between the ends, define the circular base ring 3 of the complete tower. The panels may be curved to the arc of the circle which they are to form, or they may be straight so that instead of being a true circle, they define a polygon. As shown in FIG. 2, the panels are curved, but in FIGS. 4 and 5 the panel is shown as if it were flat.

After removal of the props 17, the area within the footer is excavated to the desired contour, a curb 25 is formed against the inner edge of the footer ring and the entire area within the curb is paved, there being a foundation layer 26 and a reinforced top layer 27. It is on this area that open or latticed filling (not shown) of timber or other solids is ultimately placed and onto which the cooled water is collected and removed for reuse through a drain (not shown). The floor area thus formed is of coure water-tight or substantially so, in order to collect the cooled water.

It is ordinarily desirable to leave the earth inside the footing undisturbed so as to have firm earth to support the temporary props, but it may be necessary to do some grading to provide a working area where the forms are placed and the sectional panels cast, but this procedure may be varied from place to place, depending upon soil conditions and the topography of the building site. After the base ring has been thus formed, the building of the remainder of the structure is completed. Desirably, as shown in FIG. 8, the supporting legs may be encased in concrete to protect them, the concrete being designated 28 in this figure.

The method herein described saves considerable cost in erecting a cooling tower because it avoids the need for building a scaffold, a circular concrete form on the scaffold, and elevating and pouring the concrete in the form. Moreover with this method, each panel section, as it is removed from the form, can be inspected and tested for strength and soundness. The tower itself is of improved construction since the supporting legs are of structural steel cast into the concrete panels and securely anchored to the footing so that they can function in tension under high wind stresses as well as in compression. They slope outwardly from the base ring to the footer so that they are outside the downflowing curtain of water, as well as to conform to the slope of the panels and keep tensile stresses in the legs and panels in line. The base ring, being a horizontal section of a hollow cone, or as stated above, being a truncated cone, is in compression annularly of the ring, and therefore stable and strong. Other advantages of the invention will be apparent to those skilled in the art.

While one specific embodiment of the invention has been shown and the method of practising the same described, it will be understood that various changes and modifications may be made within the contemplation of the invention and the scope of the following claims.

I claim:

1. In the method of forming a natural draft cooling tower and like structures having a base ring supported on the ground but above ground level, the steps which comprise preforming concrete panel sections with legs attached thereto and with grooved end faces at both ends thereof, raising the sections to a position where the legs slope upwardly and inwardly toward the vertical axis of the tower with the ends of the sections in confronting spaced relation and the sections then forming a substantially circular ring, temporarily supporting the panel sections in such inclined position with props, anchoring the lower ends of the legs to a footer, filling the spaces between the panel sections including the grooved end surfaces with an air-hardening cementitious material to form interlocking keys between the panel ends, and removing the props after the ring is completed and the cementitious material has hardened and they are no longer required.

2. In the method of forming a natural draft cooling tower and like structure having a base ring supported on legs in elevated position above ground level, the steps of casting concrete ring-forming panel sections in a substantially horizontal position and embedding the upper ends of structural metal legs in the concrete when it is being cast, raising the panel sections after the concrete has set in end-to-end relation in a circular pattern to form a base ring with ends of the panels in confronting spaced relation and with the panel sections being inclined upwardly and inwardly and the legs extending downwardly and outwardly therefrom, anchoring the lower ends of the legs to a footer, and filling the spaces between the confronting ends of the sections with an air-hardening cementitious material whereby the panel sections are integrated into a generally circular wall of frusto-conical shape supported by said structural metal legs.

3. In the method of forming a natural draft cooling tower and like structures as defined in claim 2, the steps of embedding metal rods in the concrete panels when they are being cast with the ends of the rods projecting beyond the ends of the panel sections and rigidly connecting the projecting rod ends of each panel to the corresponding rod ends of the adjacent panels before the spaces between the ends of the panels are filled with air-hardening cementitious material.

4. In the method of forming a natural draft cooling tower and like structure as defined in claim 2, the steps of embedding metal rods in the concrete panels when they are being cast with the ends of the rods projecting beyond the ends of the panel sections and rigidly connecting the projecting rod ends of each panel to the corresponding rod ends of the adjacent panels before the spaces between the ends of the panels are filled with air-hardening cementitious material, temporarily supporting the panels in their inclined position by temporary props extending radially inwardly from the panels until the cementitious material between all panel sections has hardened, and thereafter removing said props.

5. In the method of forming a natural draft cooling tower as defined in claim 4, the steps of constructing a circular footer in the ground before the erection of any of the panels with the footer defining a circle of a diameter greater than the diameter of the ring formed by the panel sections whereby to support the downwardly and outwardly slopping legs of the panel sections.

6. In the method of forming a natural draft cooling tower as defined in claim 4, the step of constructing a circular footer in the ground before the erection of any of the panels with the footer defining a circular of a diameter greater than the diameter of the ring formed by the panel sections whereby to support the downwardly and outwardly-sloping legs of the panel sections, and excavating the earth within the area circumscribed by the footer, grading the excavation and covering the same with a water-collecting floor only after completion of the base ring.

References Cited by the Examiner

UNITED STATES PATENTS

| 2,419,843 | 4/1947 | Marten | 52—73 X |
| 3,226,894 | 1/1966 | Burchardt et al. | 261—108 X |

FOREIGN PATENTS

| 374,089 | 5/1932 | Great Britain. |
| 797,413 | 7/1958 | Great Britain. |

FRANK L. ABBOTT, *Primary Examiner.*

R. S. VERMUT, *Assistant Examiner.*